US008306561B2

(12) United States Patent
Kyperountas et al.

(10) Patent No.: US 8,306,561 B2
(45) Date of Patent: Nov. 6, 2012

(54) TARGETED GROUP SCALING FOR ENHANCED DISTRIBUTED SPECTRUM SENSING

(75) Inventors: Spyros Kyperountas, Weston, FL (US); Neiyer S. Correal, Cooper City, FL (US); Qicai Shi, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 558 days.

(21) Appl. No.: 12/363,855

(22) Filed: Feb. 2, 2009

(65) Prior Publication Data

US 2010/0197332 A1    Aug. 5, 2010

(51) Int. Cl.
 H04B 7/00    (2006.01)
(52) U.S. Cl. ...................................... 455/515
(58) Field of Classification Search ............. 455/515
 See application file for complete search history.

(56) References Cited

U.S. PATENT DOCUMENTS 7,043,428 B2    5/2006 Li
2009/0325482 A1* 12/2009 Zhou et al. ................ 455/25

OTHER PUBLICATIONS

Shi et al.—U.S. Appl. No. 12/410,019, filed Sep. 29, 2008, Entitled "Signal Detection in Cognitive Radio Systems"—30 pages.
A. Ghasemi et al.—"Collaborative Spectrum Sensing for Opportunistic Access in Fading Environments"—University of Toronto, Canada—IEEE 2005—pp. 131-136.
D. Pados et al.—"On-Line Threshold Learning for Neyman-Pearson Distributed Detection", IEEE Trans. Systems, Man, and Cybernetics, vol. 24, No. 10, Oct. 1994—pp. 1519-1531.
Z. Chair et al.—"Optimal Data Fusion in Multiple Sensor Detection Systems", IEEE Trans. Aerospace and Electronic Systems, vol. AES-22, No. 1, Jan. 1986—pp. 98-101.
Rao et al.—U.S. Appl. No. 12/327,543, filed Dec. 3, 2008, Entitled "Method to Improve Diversity Gain in a Cooperative Spectrum Sensing Network"—17 pages.
International Search Report and Written Opinion for counterpart International Application No. PCT/US2010/022726 mailed on Aug. 31, 2010.
International Preliminary Report on Patentability for counterpart International Application No. PCT/US2010/022726 mailed on Aug. 11, 2011.

* cited by examiner

*Primary Examiner* — Lincoln Donovan
*Assistant Examiner* — Daniel Rojas
(74) *Attorney, Agent, or Firm* — Barbara R. Doutre

(57) ABSTRACT

A method, wireless device, and information processing system dynamically update spectrum sensing groups in a wireless communication system. A set of wireless devices (114) currently allocated to a spectrum sensing group is identified. Each wireless device (114, 116, 118) in the set performs spectrum sensing on one or more wireless communication channels. Spectrum sensing performance data (144) is analyzed for each such wireless device (114) in the set. The spectrum sensing performance data (144) indicates wireless communication performance of a wireless device (114) associated with the spectrum sensing performance data with respect to detecting a transmitted signal on the one or more communication channels. Wireless device membership of the set of wireless devices (114, 116, 118) allocated to the spectrum sensing group is dynamically adjusted based on the analysis.

18 Claims, 8 Drawing Sheets

TARGETED GROUP SCALING FOR ENHANCED DISTRIBUTED SPECTRUM SENSING

FIELD OF THE INVENTION

The present invention generally relates to the field of wireless communications, and more particularly relates to managing the allocation of spectrum sensing resources within a cognitive radio network.

BACKGROUND OF THE INVENTION

Wireless communication technology has evolved greatly over the recent years. Recent studies have shown that the wireless spectrum in the U.S. is under-utilized, although most of the spectrum has been assigned to licensees, or primary users. Therefore, spectrum sharing has been proposed to alleviate the spectrum scarcity that prevents new wireless services being deployed. Spectrum sensing is a key enabling technology for secondary access in licensed bands. Spectrum sensing technologies utilize radios that monitor the radio spectrum to detect the presence or absence of primary users. Spectrum sensing complements the geo-location database approach (when a geo-location database is available) by sensing for licensed systems that are not in the database and driving channel selection and coexistence with other secondary systems. Spectrum sensing is vital for bands and incumbent signals where a geo-location database is not available.

With conventional spectrum sensing systems a problem arises when one or more sensing radios that can only minimally contribute, if at all, are included in the group detection process. For example, to achieve a target group probability of false alarm the radios that are capable of detecting the primary signal reduce their detection and false alarm probabilities to accommodate the non-contributing radios. These radios are relying on the performance of the other radios to make up for the reduced detection and false alarm probabilities. Since these radios only contribute marginally, including them is detrimental to group detection performance and wastes valuable resources and bandwidth.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

SUMMARY OF THE INVENTION

Figure 1:
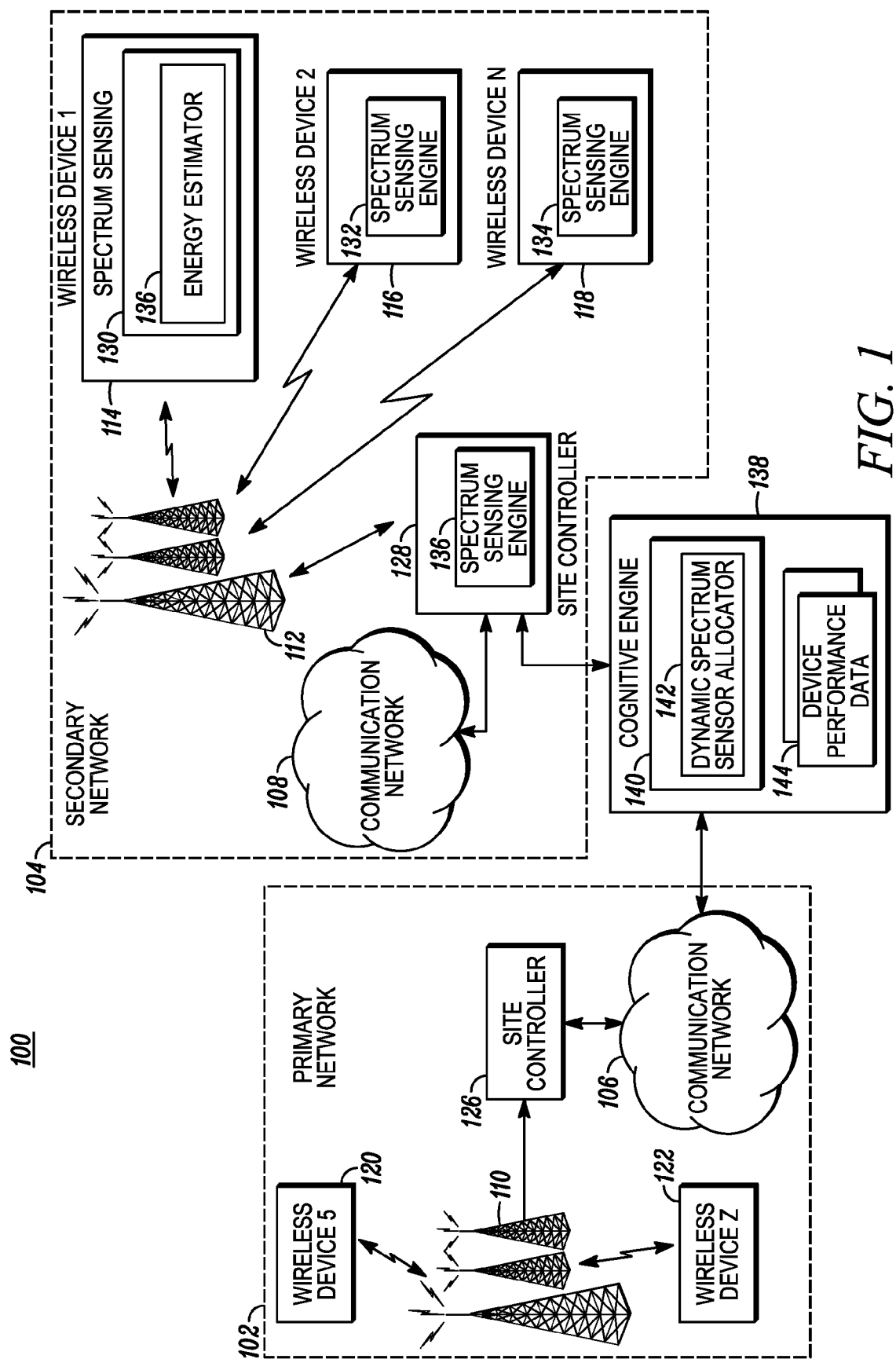
FIG. 1 is block diagram illustrating a wireless communication system according to various embodiments of the present invention.

In an embodiment, a method for dynamically updating spectrum sensing groups in a wireless communication system is disclosed. The method includes identifying a set of wireless devices currently allocated to a spectrum sensing group. Each wireless device in the set performs spectrum sensing on one or more wireless communication channels. Spectrum sensing performance data is analyzed for each such wireless device in the set. The spectrum sensing performance data indicates wireless communication performance of a wireless device associated with the spectrum sensing performance data with respect to detecting a transmitted signal on the one or more communication channels. Wireless device membership of the set of wireless devices allocated to the spectrum sensing group is dynamically adjusted based on the analyzing.

In another embodiment, a wireless device for dynamically updating spectrum sensing groups in a wireless communication system is disclosed. The wireless device includes a wireless transmitter and a wireless receiver. The wireless device also includes a memory and a processor that is communicatively coupled to the memory. A cognitive engine identifies a set of wireless devices currently allocated to a spectrum sensing group. Each wireless device in the set performs spectrum sensing on one or more wireless communication channels. Spectrum sensing performance data is analyzed for each such wireless device in the set. The spectrum sensing performance data indicates wireless communication performance of a wireless device associated with the spectrum sensing performance data with respect to detecting a transmitted signal on the one or more communication channels. Wireless device membership of the set of wireless devices allocated to the spectrum sensing group is dynamically adjusted based on the analyzing.

In yet another embodiment, an information processing system for dynamically updating spectrum sensing groups in a wireless communication system is disclosed. The information processing system includes a communication adapter and a memory. A processor is communicatively coupled to the memory. A cognitive engine identifies a set of wireless devices currently allocated to a spectrum sensing group. Each wireless device in the set performs spectrum sensing on one or more wireless communication channels. Spectrum sensing performance data is analyzed for each such wireless device in the set. The spectrum sensing performance data indicates wireless communication performance of a wireless device associated with the spectrum sensing performance data with respect to detecting a transmitted signal on the one or more communication channels. Wireless device membership of the set of wireless devices allocated to the spectrum sensing group is dynamically adjusted based on the analyzing.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device can include (but is not limited to) any one or a combination of the following: a two-way radio, a cellular telephone, a mobile phone, a smartphone, a two-way pager, a wireless messaging device, a laptop/computer, automotive gateway, or a residential gateway.

One advantage of various embodiments of the present invention is that allocated spectrum sensing resources are dynamically adjusted to provide optimal performance of the spectrum sensing system. In particular, various embodiments of the present invention select an appropriate subset of sensing radios out of a larger set to improve the probability of detection of the overall system while maintaining the required system probability of false alarm. Furthermore, by reducing the number of sensors collaborating to only the essential radios vital communication bandwidth can be saved since the non-essential sensors do not have to send their detection results to a fusion center. Additionally, sensor resources are saved and the remaining sensors which are not included in the subset of sensors are able to be allocated for detecting a different incumbent signal or to examine a different band for incumbents.

Operating Environment

According to an embodiment of the present invention as shown in FIG. 1 an example of a wireless communication system 100 is illustrated. FIG. 1 shows a plurality of networks 102, 104. Although only two networks 102, 104 are shown, the wireless communication system 100 can comprise additional networks. In an embodiment, one of the networks 102 is a host/primary network and one or more of the additional networks are secondary networks 104. In an embodiment, a host/primary network can be an underlay network and a secondary network can be an overlay network. The host/primary network 102 is assigned RF spectrum that is divided into channels that can potentially be used by the secondary network(s) 104. Throughout this discussion the terms "host" and "primary" that refer to, for example, host/primary network 102, are used interchangeably. The type of wireless communication system that allows for a secondary network to utilize the RF spectrum of a host/primary network is commonly referred to as Cognitive Radio ("CR") system.

Each of the wireless communication networks 102, 104 can include one or more communication networks 106, 108 such as a circuit service network and/or a packet data network. The communication networks 106, 108 can either be wired or wireless. The wireless communications standard of the networks 102, 104 coupling base stations 110, 112 to mobiles 114 to 122 can comprise Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), other IEEE 802.16 standards, Orthogonal Frequency Division Multiplexing ("OFDM"), Orthogonal Frequency Division Multiple Access ("OFDMA"), Wireless LAN ("WLAN"), WiMAX, or the like. The wireless communications networks 102, 104 are able to be an Internet Protocol ("IP") or Session Initiation Protocol ("SIP") based connectivity network, which provides data connections at much higher transfer rates than a traditional circuit services network. These networks are able to comprise an Evolution Data Only ("EV-DO") network, a General Packet Radio Service ("GPRS") network, a Universal Mobile Telecommunications System ("UMTS") network, an 802.11 network, an 802.16 (WiMAX) network, Ethernet connectivity, dial-up modem connectivity, or the like.

A circuit services network is able to provide, among other things, voice services to the wireless devices 114 to 122 communicatively coupled to one or both of networks 102, 104. Other applicable communications standards include those used for Public Safety Communication Networks including TErrestrial TRunked rAdio ("TETRA") and P25 Trunking. It should be noted that these network technologies are only used as an illustrative example and do not limit further embodiments of the present invention. Each of the wireless communication networks 102, 104 includes a plurality of base stations 110, 112. Each of the base stations 110, 112 is communicatively coupled to an information processing system 126, 128 such as a site controller 126, 128.

As discussed above, the wireless communication system 100, in an embodiment, is a CR system. In a cognitive radio (CR) system of the type considered for use by IEEE 802.22, a cognitive secondary radio system utilizes spectrum assigned to a primary system using an opportunistic approach. With this approach, the secondary radio system shares the spectrum with primary incumbents as well as those operating under authorization on a secondary basis. Under these conditions, it is imperative that any user in the cognitive radio system not interfere with primary users.

Therefore, in an embodiment, the devices 114, 116, 118 sense the channel to detect a licensed, primary user 120, 122. The devices 114, 116, 118 are allowed to transmit if their transmissions will not interfere with any primary user 120, 122. In an embodiment this is accomplished by the devices (e.g., secondary users) 114, 116, 118 detecting primary user signals on a given channel. In order to perform signal detection, the devices 114, 116, 118 (which can also be referred to as "spectrum sensing devices", "sensors", "nodes", and "secondary users"), utilize one or more spectrum sensing methods. For example, a spectrum sensing device 114 can utilize adaptive noise level estimation for estimating noise levels, which enables robust signal detection. For example, the noise level estimations, which take into account time-varying noise levels, are used to dynamically and adaptively determine detection criteria.

An example of a detection criterion is a detection threshold. Detection thresholds are used to identify whether an active signal is on a channel as compared to noise on the channel based on energy estimation $\epsilon$, and therefore can be used by a device 114, 116, 118 to determine whether its transmissions would cause interference to the primary user. A more detailed discussion on adaptive noise level estimation can be found in the co-pending and commonly owned U.S. patent application Ser. No. 12/241,019, entitled "Signal Detection In Cognitive Radio Systems", filed on Sep. 29, 2008. It should be noted that the various embodiments of the present invention are not limited to performing adaptive noise level estimation. For example, a device 114 can simply monitor the signal strength of a given channel, or perform detection by looking for specific features of the primary signal such as pilot tones or spectral correlations.

In the example of FIG. 1, each of the secondary network wireless devices 114, 116, 118 includes a spectrum sensing engine 130, 132, 134 for performing the spectrum sensing discussed above. The spectrum sensing engines 130, 132, 134, in this embodiment, include an energy estimator 136 for determining the energy associated with an observed signal. Energy detection is just used for illustrative and non-limiting purposes, as one of many possible spectrum sensing methods can be used instead. For example, spectrum sensing can also be performed by looking for specific features of the primary signal such as pilot tones or spectral correlations.

In another embodiment of FIG. 1, each secondary network wireless device 114, 116, 118 can transmit information associated with an observed signal such as energy estimation to a central processing system 138 or a fusion center. This central processing system 138 comprises a cognitive engine 140 that utilizes the information received from each of the devices 114, 116, 118 to determine whether noise or a signal exists on a particular channel in the primary network 102 based on a detection algorithm managed by the central system 138 such as comparison to a detection threshold. The detection threshold indicates a desired system performance for performing spectrum sensing and is used to identify whether an active signal is on a channel as compared to noise on the channel based on energy estimation $\epsilon$. The central processing system 138 is then able to notify the secondary network wireless devices 114, 116, 118 whether a signal or noise has been detected on the given channel so the wireless devices 114, 116, 118 can decide to transmit or not transmit on the channel.

In another embodiment, each of the devices 114, 116, 118 comprises, in addition to the spectrum sensing engine 130, 132, 134, a cognitive engine (not shown) and a detection criteria database (not shown) for maintaining information sets associated with one or more detection criteria such as, but not limited to, thresholds for performing the spectrum sensing. In this embodiment, the devices 114, 116, 118 perform the signal detection operations discussed above with respect to the central processing system 138. Stated differently, the devices 114, 116, 118 are not required to transmit spectrum sensing information to the central processing system 138 for signal detection. For example, in this embodiment, the cognitive engine of the devices 114, 116, 118 utilizes the observed spectrum sensing data and determines whether noise or a signal exists on a particular channel in the primary network 102 based on the detection threshold. In this embodiment, the detection threshold can be maintained and updated by the device 114 itself or by the central processing system 138, which is discussed in greater detail below.

In yet another embodiment, one or of the devices 114, 116, 118 can perform the functions of the central processing system 138 discussed above for the remaining devices. For example, a first device 114 can include a spectrum sensing engine 130 and a cognitive engine. The other devices 116, 118 can transmit spectrum sensing data the first device 114. The first device 114 analyzes the spectrum sensing data received from the other devices 116, 118 and determines whether noise or a signal exists on a particular channel in the primary network 102 based on a detection criteria, which can be managed by the central system or the first device 114. The first device 114 is then able to notify the other secondary network wireless devices 116, 118 whether a signal or noise has been detected on the given channel so the wireless devices 116, 118 can decide to transmit or not transmit on the channel. It should be noted that in the embodiments discussed above, the detection criteria can be maintained and updated by the devices 114, 116, 118 themselves or by the central processing system, which is discussed in greater detail below.

In yet another an embodiment where the central processing system 138 is deployed, the cognitive engine 140 of the central processing system 138 also includes a dynamic spectrum sensor allocator 142. The dynamic spectrum sensor allocator 142 selects and allocates which sensing devices 114, 116, 118 are to perform spectrum sensing. As discussed above, various problems occur when one or more sensing radios that can only minimally contribute, if at all, are included in the group detection process. Therefore, the cognitive engine 140 monitors and analyzes device performance information/statistics 144 to determine which devices to allocate or de-allocate (or eliminate) to/from a spectrum sensing group. For example, the cognitive engine 140, via the dynamic spectrum sensor allocator 142 selects a subset of sensing radios out of a larger set to improve the probability of detection of the overall system while maintaining the required system probability of false alarm. By reducing the number of sensors collaborating to only the essential sensors communication bandwidth and sensor resources can be saved since the non-essential sensors do not have to send their detection results to the central processing system 138. The dynamic spectrum sensor allocator 142 can also allocate the non-selected or de-allocated sensors to perform spectrum sensing on a different incumbent signal or examine a different band for incumbents. This dynamic allocation process is discussed in greater detail below.

Group Scaling for Enhanced Distributed Spectrum Sensing

As discussed above, in distributed spectrum detection, the individual node probability of false alarm ("Pfa$_i$.") and thus the probability of detection ("Pd$_i$.) is reduced to achieve a target system Pfa at the central processing system. Fortunately, with collaboration, the diversity gains provided by group detection more than compensate for the fact that the individual detectors operate at a lower probability of detection. However, with collaborating nodes, if a portion of the participating nodes minimally contribute to the group detection process, then the system detection performance deteriorates since all nodes that do contribute operate at a lower Pd$_i$, and cause a detriment to group detection performance. Furthermore, resources are wasted.

Figure 2:
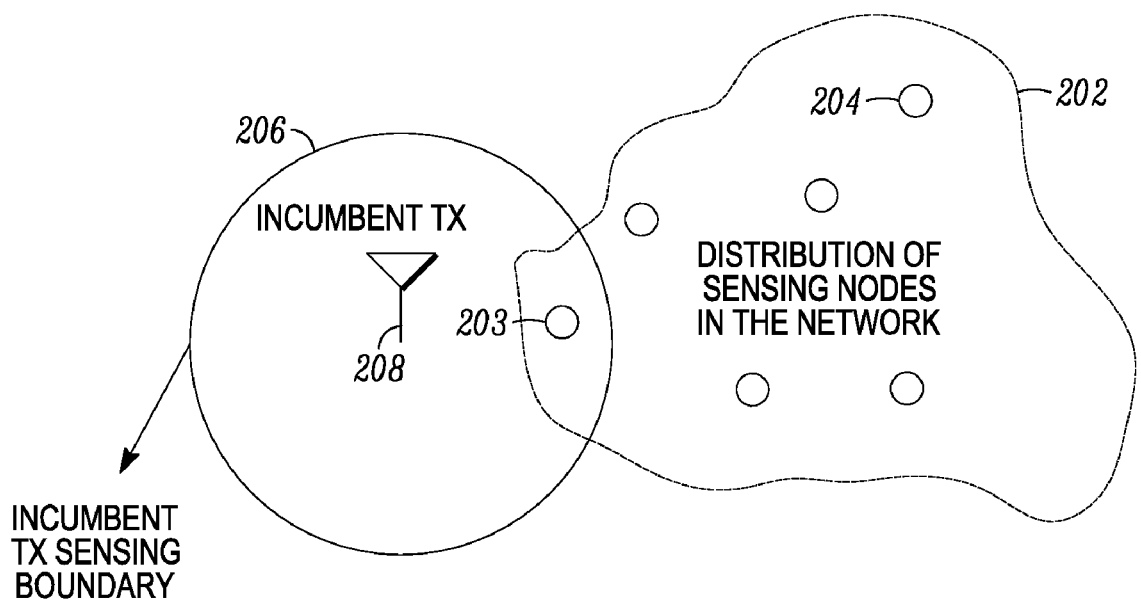
FIGS. 2 and 3 illustrate distributed sensing network positions relative to the incumbent signal sensing boundary according to an embodiment of the present invention.
Figure 3:
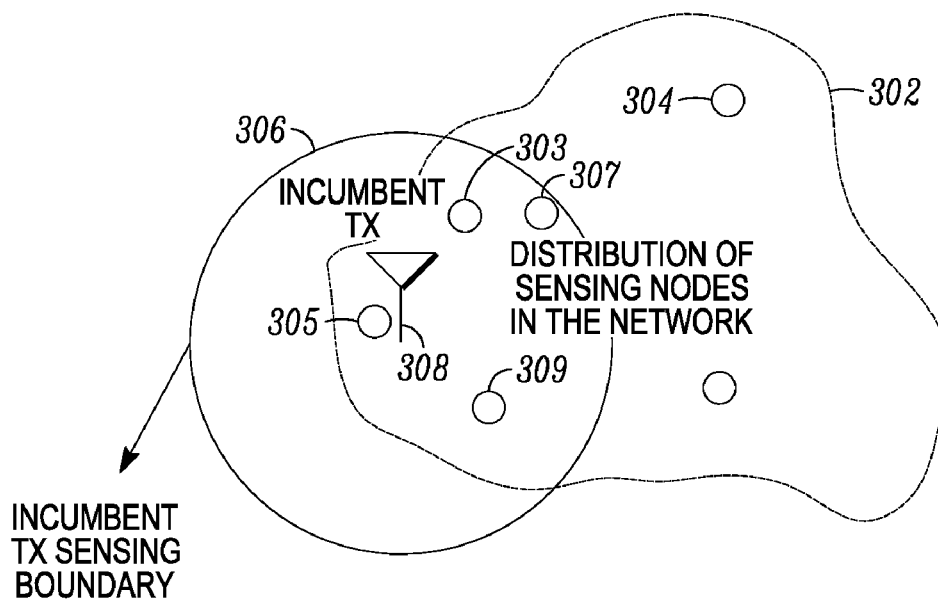

FIGS. 2 and 3 show an example of the problem discussed above where a portion of the participating nodes minimally contribute to the group detection process. The spatial deployment of the distributed sensing network is illustrated by the dotted line 202, 302 and the individual sensor nodes (sensors) are indicated by the shaded circles 204, 304. The solid line circle 206, 306 around the primary transmitter 208, 308 indicates the signal boundary of the primary signal that system is trying to detect. Since in the absence of geographic information on primary transmitters one does not know where the primary transmitter is located (the system does not know if there is a signal at all), it is difficult to know in advance which sensors are inside the contour (the solid line circle 206, 306) and should be included in group detection. For example, the situation could be that as illustrated in FIG. 2, where only one sensor 203 out of six is in range, or as illustrated in FIG. 3, where four sensors 303, 305, 307, 309 out of six are in range.

The nodes that are in range (inside the solid line circle 206, 306) are considered to contribute towards the collaborative detection.

Figure 4:
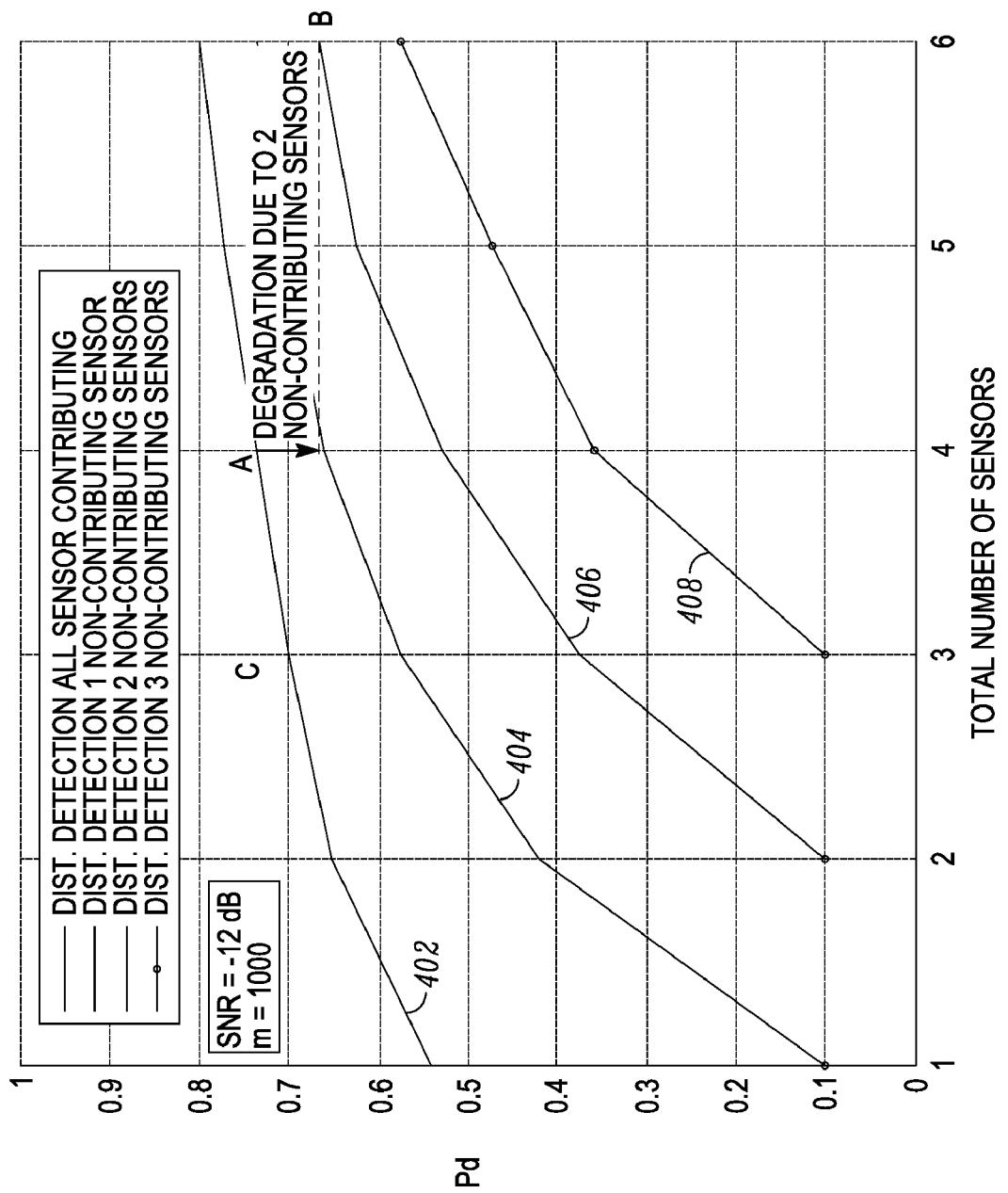
FIG. 4 is a graph illustrating an example of the probability of detection as a function of the total number of users participating in distributed detection according to an embodiment of the present invention.

Simulations were performed to examine this problem and evaluate the impact of non-contributing sensors on the overall distributed sensing detection performance. In an embodiment, an assumption was made that the spectrum detection system is designed to operate at a target false alarm ("$P_{fa}$") rate of 10% and that the radios use energy detectors for local detection. For the baseline case, one can assume that all sensors are able to observe the primary signal at a mean received SNR=−12 dB. In the baseline case, the total number of cooperating sensors N in the distributed sensing network was varied from 1 to 6 and group decisions were made by ORing the local decisions from the individual detectors. Throughout the simulations, the 10% requirement for system false alarm probability was met, i.e. all distributed system detectors regardless of number of sensors are designed as Neyman-Pearson ("NP") detectors with constant false alarm probability. In the simulations the total number of samples used per sensor for signal detection was m=1000. The resulting baseline curve for probability of detection ("$P_d$") (at a 10% false alarm) achieved with OR combining when all the participating sensors contribute to group detection is shown in FIG. 4 by the circles on the first line 402. This is the case where all sensors used in distributed detection are inside the contour (larger circle) and thus actively contribute to group detection.

In order to establish the detriment in detection probability caused by non-contributing users in the group, simulations were then run where 1, 2, and 3 out-of-N detectors used for group detection are non-contributing (i.e. they are outside the contour). The resulting probabilities of detection curves as a function of the total number of sensors (contributing+non-contributing) in the group (for a group false alarm rate of 10%) are shown by the squares on the second line 404 in FIG. 4 for one non-contributing sensor, by the X's on the third line 406 for two non-contributing sensors, and the dots on the fourth line 406 for three non-contributing sensors. As FIG. 4 illustrates, as non-contributing sensors are added to the group decision process the detection performance decreases steadily. Also FIG. 4 indicates that it is possible to achieve better detection performance with a smaller number of participating sensors, all contributing, than having to some extent a larger number of collaborative nodes where a number of them do not contribute to the distributed detection process.

For example point A on FIG. 4 represents a collaborative sensing network of 4 nodes that are all inside the primary Tx contour. Point B on FIG. 4 represents a collaborative sensing network of 6 nodes that also has four sensors inside the contour, but also has two sensing nodes outside the contour. Even though both networks have the same number of contributing nodes (four) inside the detection contour, the network that has two additional nodes outside the contour experiences a probability of detection degradation of about 8%. Also, note that the detection performance for point C where three contributing nodes are used in the group detection scheme is better than that for point B, were four sensors are inside the contour and two are outside.

The cognitive engine 140 of the central processing system 138 improves group detection performance by identifying the key contributing detectors and weeding out the detectors having inconsequential contributions to detection performance. Stated differently, the cognitive engine 140 adaptively eliminates nodes from the cooperative detection process that minimally contribute. In an embodiment, the cognitive engine 140 identifies the detectors having inconsequential contributions by observing the time series of detection decisions of each sensor 114, 116, 118 and then constructing estimates of their respective probabilities of detection over time. The time series of detection decisions and the constructed estimates can be stored in the central processing system 138 as the performance information/statistics 144. The dynamic spectrum sensor allocator 142 then excludes from group detection the detectors that satisfy:

$$\frac{\hat{P}_{di}}{\max_{i=1,\ldots,N}(\hat{P}_{di})} < \alpha, i = 1, 2, \ldots, N \quad (EQ\ 1)$$

where N is the total number of available sensors to be used for distributed detection, $\hat{P}_{di}$ is the estimated probability of detection of the $i^{th}$ node, and $0<\alpha<1$.

After downscaling the set of sensing nodes 114, 116, 118 by the dynamic spectrum sensor allocator 142, the cognitive engine 140 re-estimates the detection criteria such as, but not limited to a detection threshold, of each detector 114, 116, 118 in order to meet the desired probability of false alarm based on the reduced set of sensors to be used in group detection and performs the sensing procedure again with fewer nodes to obtain better detection results. Furthermore, by reducing the number of sensors participating in group detection to only the essential ones, communication bandwidth is enhanced since the non-essential sensors do not have to send results to the central processing system. In addition, the released sensor resources can be used to detect a different incumbent signal or examine a different band for incumbents.

Figure 5:
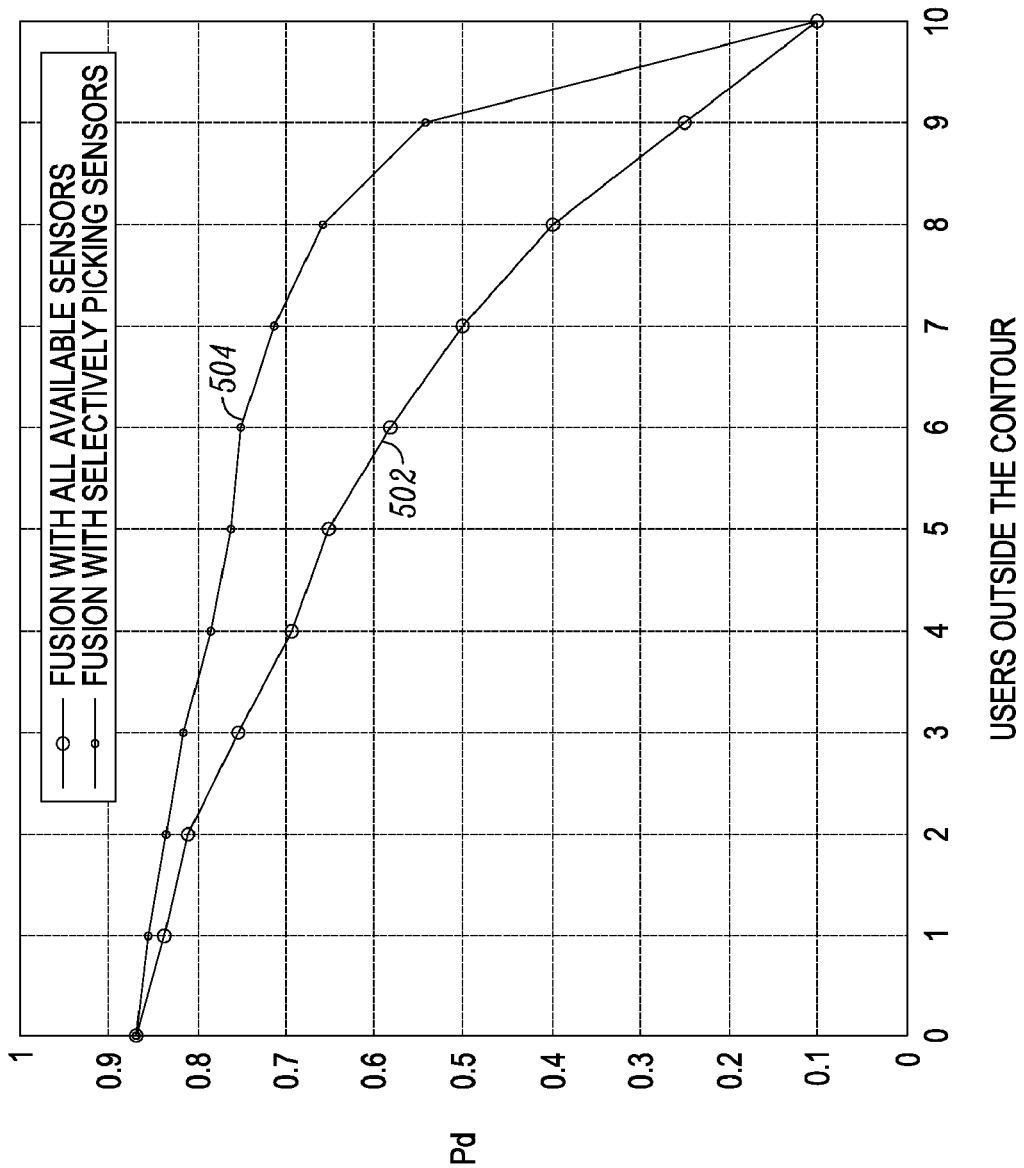
FIG. 5 is a graph illustrating an a example of system probability of detection vs. the total number of sensors outside the contour according to an embodiment of the present invention.

Simulations were performed to demonstrate the effect of various embodiments of the present invention on the detection performance. The same setup discussed above with respect to FIG. 2 was used, and the simulations started with ten nodes available for collaboration all of which were inside the contour 206, 306. The parameter α in EQ 1 was set to α=0.8. Detection thresholds were used as one type of detection criteria and were set so that the probability of false alarm of group detection with the 10 nodes is 10%. Monte Carlo simulations were carried out where the number of non-contributing nodes (outside the contour 206, 306) was incrementally increased from 0 to 10. FIG. 5 shows the probability of detection for distributed detection as a function of the number of non-contributing sensors located outside the contour 206, 306 in FIG. 2 (out of ten nodes). The first curve 502 corresponds to the case where distributed detection is achieved using all the ten available nodes. The detection results when the various embodiments of the present invention are used to narrow down the sensors participating in distributed sensing are shown by the second line 504. As the number of sensors inside the contour decreases, the detection performance decreases (lower diversity gain). However, identifying and using a subset of sensors for collaborative detection utilizing the various embodiments of the present invention greatly improves the overall performance that is achieved with distributed sensing. For example for the case when there are only three contributing nodes inside the contour 206, 306 and seven outside, the probability of group detection goes from 50% to 70% when one or more embodiments of the present invention are applied.

Figure 6:
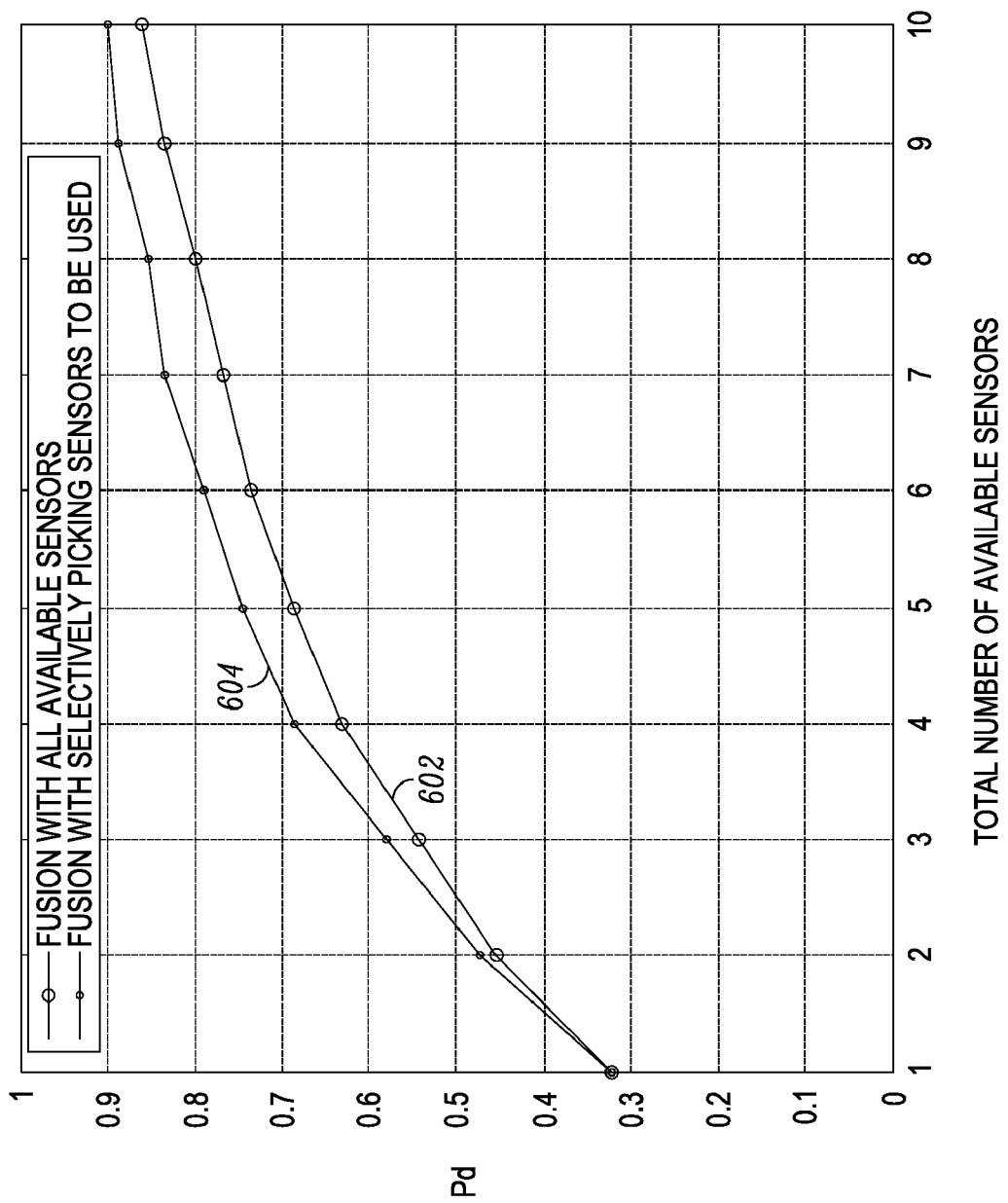
FIG. 6 is a graph illustrating an example of system probability of detection vs. the total number of sensors available for distributed detection according to an embodiment of the present invention.

Another manifestation of the problem discussed above (where a portion of the participating nodes minimally contribute to the group detection process) exists in the presence of fading environments where the signal received by the sensing nodes experiences different levels of shadowing even for sensors inside the contour. If a portion of the sensing nodes experience harsh fading conditions, by identifying and removing them from group detections discussed above, one can improve the performance of the group detection process. The inventors performed simulations for operation in a log-normal channel with shadowing standard deviation σ=10 dB. The average signal to noise ratio at the sensors was set to SNR=−20 dB. The total number of participating sensors was varied from 1 to 10, the total number of samples used per node per decision was set to m=1000, and α=0.8 to form equation 1. The system probability of false alarm was kept at 10% for all simulations. The first curve 602 in FIG. 6 shows the performance when all available nodes are used in the group decision process. The detection results with the various embodiments of the present invention are shown by the second line 604. It is apparent that eliminating (e.g., de-allocating) heavily faded nodes from the collaborative detection process improves the overall group detection performance. An interesting fact from this scenario is that when there are 10 sensors participating, on average only 2.5 sensors are picked to contribute to distributed detection using EQ 1, and yet produce better results.

Wireless Device

Figure 7:
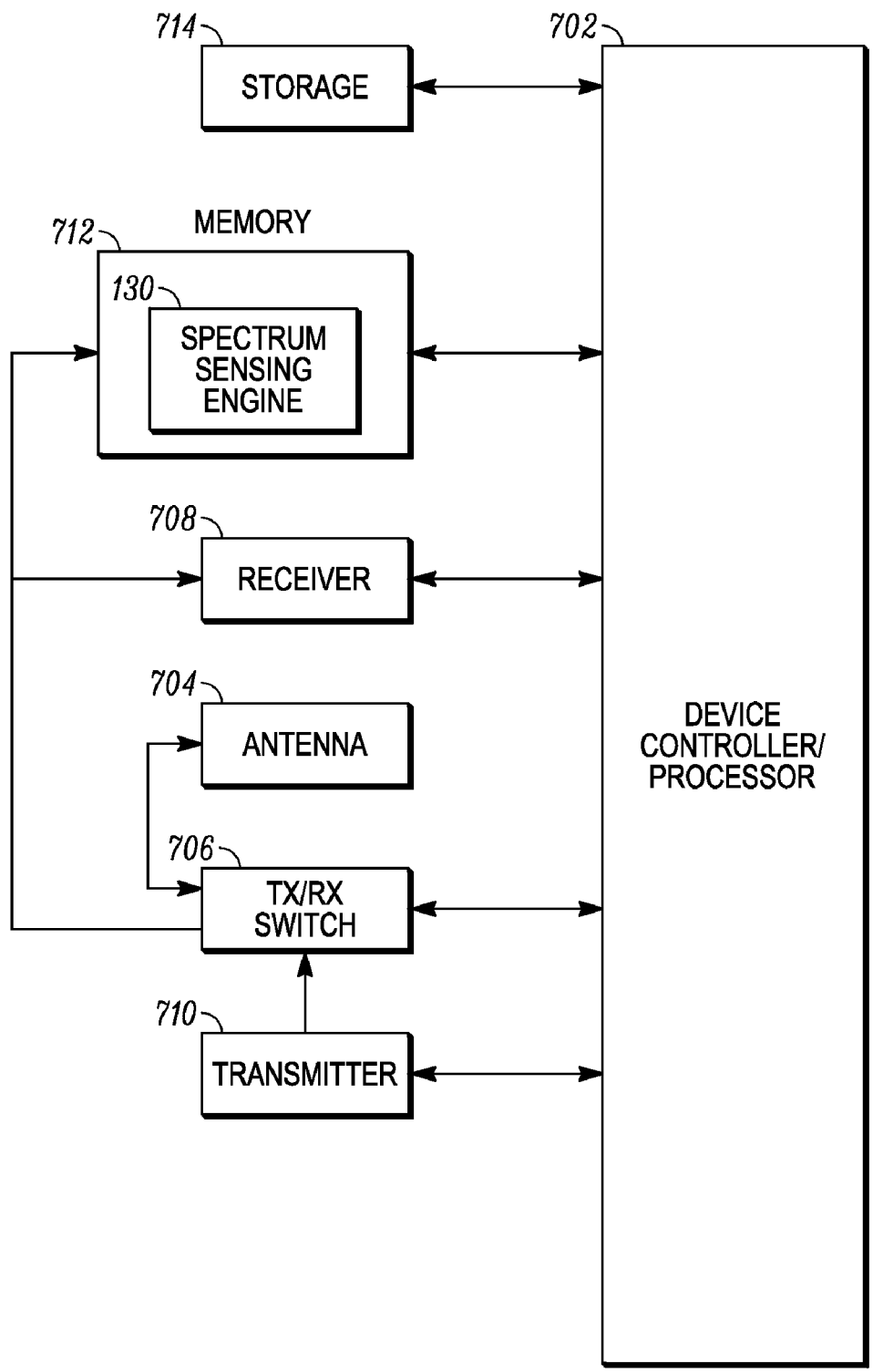
FIG. 7 is a block diagram illustrating a detailed view of a wireless device according to an embodiment of the present invention.

FIG. 7 is a block diagram illustrating a detailed view of a wireless device 114 according to an embodiment of the present invention. It is assumed that the reader is familiar with wireless communication devices. To simplify the present description, only that portion of a wireless communication device that is relevant to the present invention is discussed. The wireless device 114 operates under the control of a device controller/processor 702, that controls the sending and receiving of wireless communication signals. In receive mode, the device controller 702 electrically couples an antenna 704 through a transmit/receive switch 706 to a receiver 708. The receiver 708 decodes the received signals and provides those decoded signals to the device controller 702.

In transmit mode, the device controller 702 electrically couples the antenna 704, through the transmit/receive switch 706, to a transmitter 710. It should be noted that in an embodiment, the receiver 708 and the transmitter 710 are a dual mode receiver and a dual mode transmitter for receiving/transmitting over various access networks providing different air interface types. In another embodiment a separate receiver and transmitter is used for each of type of air interface. A memory 712 includes, among other things, the spectrum sensing engine 130, which has been discussed above. The wireless device 114, also includes non-volatile storage memory 714 for storing, for example, an application waiting to be executed (not shown) on the wireless device 114.

Information Processing System

Figure 8:
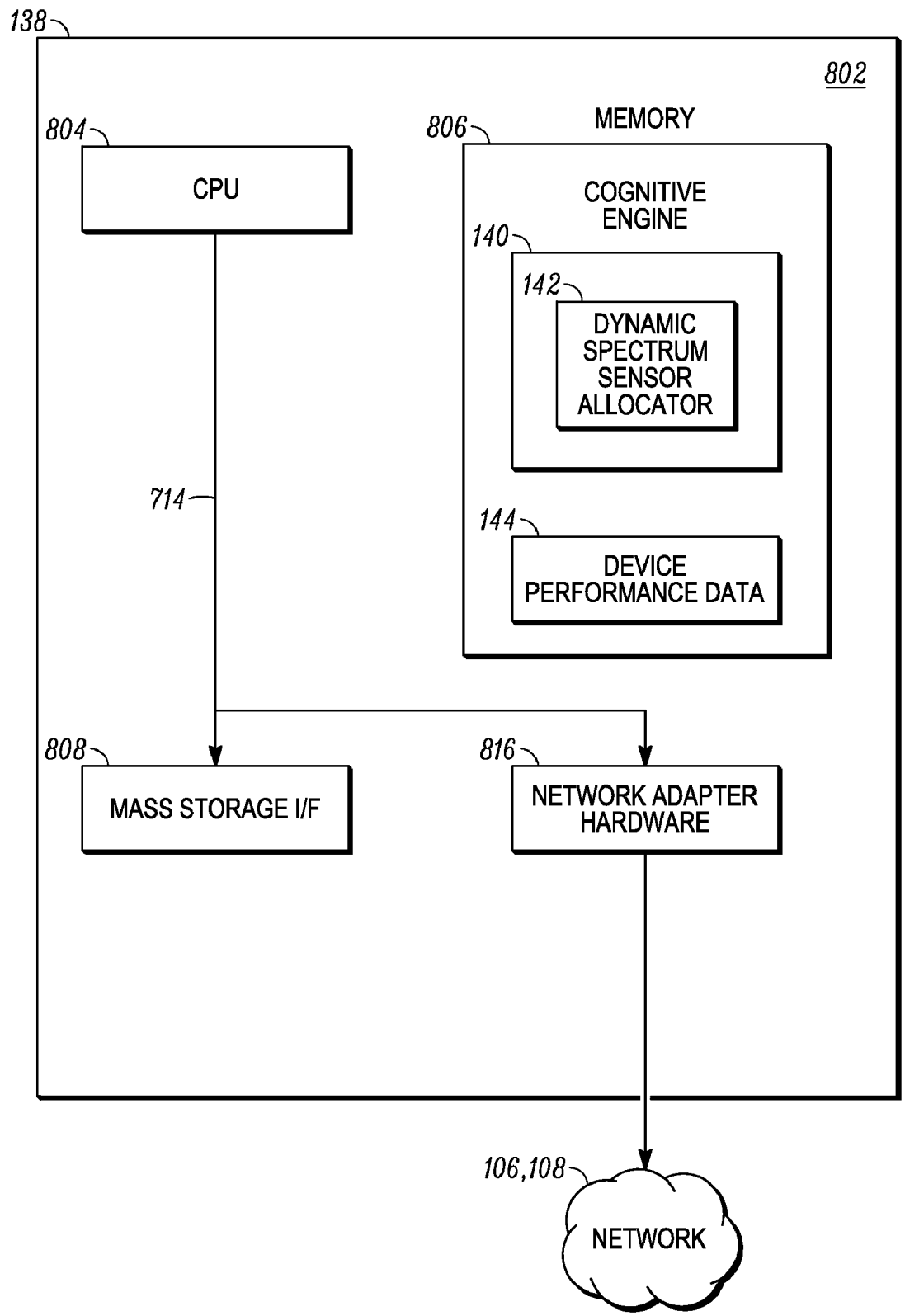
FIG. 8 is a block diagram illustrating a detailed view of an information processing system according to an embodiment of the present invention.

FIG. 8 is a block diagram illustrating a more detailed view of an information processing system 138. The information processing system 138 is based upon a suitably configured processing system adapted to implement an embodiment of the present invention. For example, a personal computer, workstation, or the like, may be used. The information processing system 138 includes a computer 802. The computer 802 has a CPU processor 804 that is connected to a main memory 806, a mass storage interface 808, and communication network adapter hardware 816. A system bus 814 interconnects these system components.

The main memory 806 includes the cognitive engine 140, the dynamic spectrum sensor allocator 142, and the device performance data 144, which have been discussed in greater detail above. Also, the cognitive engine 140 and the dynamic spectrum sensor allocator 142 can also reside within a sensing device 114, 116, 118 as well. Although illustrated as concurrently resident in the main memory 806, it is clear that respective components of the main memory 806 are not required to be completely resident in the main memory 806 at all times or even at the same time. Furthermore, one or more of these components can be implemented as hardware. The mass storage interface 808 can store data on a hard-drive or media such as a CD or DVD. The communication network adapter hardware 816, in an embodiment, is used to provide an interface to the communication network 106, 108. Certain embodiments of the present invention are able to be adapted to work with any data communications links, including present day analog and/or digital techniques or via a future networking mechanism.

Process of Dynamically Updating Spectrum Sensor Allocation

Figure 9:
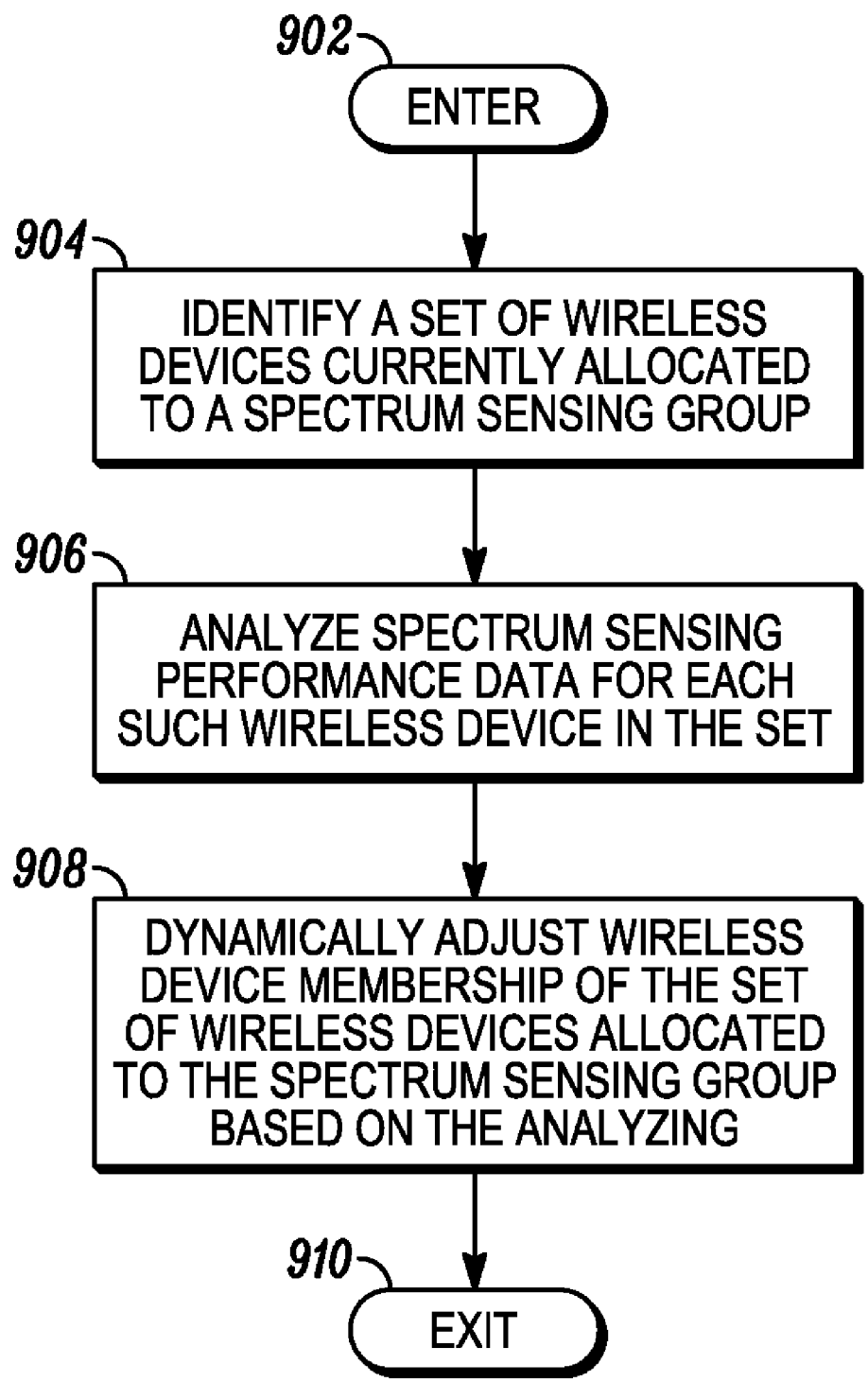
FIG. 9 is an operational flow diagram illustrating a process of dynamically updating spectrum sensors allocated to a distributed spectrum sensing group according to an embodiment of the present invention.

FIG. 9 is an operational flow diagram illustrating a process of dynamically updating spectrum sensor allocation to a spectrum sensing group according to an embodiment of the present invention. The operational flow diagram of FIG. 9 begins at step 902 and flows directly to step 904. The cognitive engine 140, at step 904, identifies a set of wireless devices currently allocated to a spectrum sensing group. Each wireless device in the set performs spectrum sensing on one or more wireless communication channels. The cognitive engine 140, at step 906, analyzes spectrum sensing performance data 144 for each such wireless device in the set. The spectrum sensing performance data 144 indicates wireless communication performance of a wireless device associated with the spectrum sensing performance data with respect to detecting a transmitted signal on the one or more communication channels. The dynamic spectrum sensor allocator 142, at step 908, then dynamically adjusts wireless device membership of the set of wireless devices allocated to the spectrum sensing group based on the analyzing. The control flow then exits at step 910.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a wireless communication controller, for dynamically updating spectrum sensing groups in a wireless communication system, the method comprising:

identifying a set of wireless devices currently allocated to a spectrum sensing group, wherein each wireless device in the set performs spectrum sensing on one or more wireless communication channels;

analyzing, with each such wireless device in the set, spectrum sensing performance data that indicates wireless communication performance of a wireless device associated with the spectrum sensing performance data with respect to detecting a transmitted signal on the one or more communication channels, wherein the analyzing further comprises observing a time series of the spectrum sensing performance data for each wireless device in the set for a given time interval and constructing an estimate of a probability of detection over time for each wireless device in the set based on observing the time series associated therewith; and dynamically adjusting wireless device membership of the set of wireless devices allocated to the spectrum sensing group based on the analyzing.

2. The method of claim 1, further comprising:
updating a detection criteria associated with each wireless device in the set of wireless devices in which wireless device membership has been dynamically adjusted, wherein the detection criteria indicates whether one of an active signal and noise is on a channel.

3. The method of claim 1, wherein the dynamically adjusting further comprises:
dynamically de-allocating at least one wireless device from the spectrum sensing group.

4. The method of claim 3, further comprising:
allocating the at least one wireless device that has been de-allocated to perform spectrum sensing on a different wireless communication channel than the one or more wireless communication channels.

5. The method of claim 1, wherein the dynamically adjusting further comprises:
dynamically adding at least one wireless device to the spectrum sensing group.

6. The method of claim 1, wherein the set of wireless devices currently allocated to a spectrum sensing group comprises two or more wireless devices.

7. A wireless device for dynamically updating spectrum sensing groups in a wireless communication system, the wireless device comprising:
a wireless transmitter;
a wireless receiver;
a memory;
a processor communicatively coupled to the memory; and
a cognitive engine communicatively coupled to the memory and the processor, wherein the cognitive engine is adapted to:
identify a set of wireless devices currently allocated to a spectrum sensing group, wherein each wireless device in the set performs spectrum sensing on one or more wireless communication channels;
analyze, from each such wireless device in the set, spectrum sensing performance data that indicates wireless communication performance of a wireless device associated with the spectrum sensing performance data with respect to detecting a transmitted signal on the one or more communication channels, wherein the cognitive engine is further adapted to analyze by observing a time series of the spectrum sensing performance data for each wireless device in the set for a given time interval and by constructing an estimate of a probability of detection over time for each wireless device in the set based on observing the time series associated therewith; and
dynamically adjust wireless device membership of the set of wireless devices allocated to the spectrum sensing group based on the analyzing.

8. The wireless device of claim 7, wherein the cognitive engine is further adapted to dynamically adjust by:
dynamically de-allocating at least one wireless device from the spectrum sensing group.

9. The wireless device of claim 8, wherein the cognitive engine is further adapted to:
allocate the at least one wireless device that has been de-allocated to perform spectrum sensing on a different wireless communication channel than the one or more wireless communication channels.

10. The wireless device of claim 7, wherein the cognitive engine is further adapted to dynamically adjust by:
dynamically adding at least one wireless device to the spectrum sensing group.

11. The wireless device of claim 7, wherein the cognitive engine is further adapted to:
update a detection criteria associated with each wireless device in the set of wireless devices in which wireless device membership has been dynamically adjusted, wherein the detection criteria indicates whether one of an active signal and noise is on a channel based on a signal detection algorithm.

12. The wireless device of claim 7, wherein the set of wireless devices currently allocated to a spectrum sensing group comprises two or more wireless devices.

13. An information processing system for dynamically updating spectrum sensing groups in a wireless communication system, comprising:
a communication network adapter;
a memory;
a processor communicatively coupled to the memory and the communication network adapter; and
a cognitive engine communicatively coupled to the memory, the processor, and the communication network adapter, wherein the cognitive engine is adapted to:
identify a set of wireless devices currently allocated to a spectrum sensing group, wherein each wireless device in the set performs spectrum sensing on one or more wireless communication channels;
analyze, from each such wireless device in the set, spectrum sensing performance data that indicates wireless communication performance of a wireless device associated with the spectrum sensing performance data with respect to detecting a transmitted signal on the one or more communication channels, wherein the cognitive engine is further adapted to analyze by observing a time series of the spectrum sensing performance data for each wireless device in the set for a given time interval and constructing an estimate of a probability of detection over time for each wireless device in the set based on observing the time series set associated therewith; and
dynamically adjust wireless device membership of the set of wireless devices allocated to the spectrum sensing group based on the analyzing.

14. The information processing system of claim 13, wherein the cognitive engine is further adapted to dynamically adjust by:
adaptively eliminate at least one wireless device from the spectrum sensing group.

15. The information processing system of claim 14, wherein the cognitive engine is further adapted to:
allocate the at least one wireless device that has been adaptively eliminated to perform spectrum sensing on a different wireless communication channel that the one or more wireless communication channels.

16. The information processing system of claim 13, wherein the cognitive engine is further adapted to dynamically adjust by:
dynamically adding at least one wireless device to the spectrum sensing group.

17. The information processing system of claim 13, wherein the cognitive engine is further adapted to:
update a detection criterion associated with each wireless device in the set of wireless devices in which wireless device membership has been dynamically adjusted, wherein the detection criterion indicates whether one of an active signal and noise is on a channel based on an energy estimation.

18. The information processing system of claim 13, wherein the set of wireless devices currently allocated to a spectrum sensing group comprises two or more wireless devices.

* * * * *

UNITED STATES PATENT AND TRADEMARK OFFICE
CERTIFICATE OF CORRECTION

PATENT NO. : 8,306,561 B2  Page 1 of 1
APPLICATION NO. : 12/363855
DATED : November 6, 2012
INVENTOR(S) : Kyperountas et al.

It is certified that error appears in the above-identified patent and that said Letters Patent is hereby corrected as shown below:

On the Title Page, in Item (56), under "U.S. PATENT DOCUMENTS", in Column 1, Line 1, below "7,043,428 B2", insert -- 2008/0112427 A1 5/2008 Seidel, Scott Y. et al. --.

On the Title Page, in Item (56), under "U.S. PATENT DOCUMENTS", in Column 1, Line 2, above "2009/0325482", insert -- 2009/0016293 A1 1/2009 Kang, Bub-Joo et al. --.

On the Title Page, in Item (56), under "U.S. PATENT DOCUMENTS", in Column 1, Line 3, insert
-- FOREIGN PATENT DOCUMENTS
KR 100808045 3/2008
KR 100872819 12/2008 --.

In the Specifications:

In Column 1, Line 51, delete "is" and insert -- is a --, therefor.

In Column 6, Line 39, delete "("Pfa$_i$")" and insert -- ("Pfa$_i$") --, therefor.

In Column 6, Line 40, delete "("Pd$_i$")" and insert -- ("Pd$_i$") --, therefor.

In Column 7, Line 22, delete "("Pd")" and insert -- ("Pd") --, therefor.

In Column 8, Line 17, delete " $\hat{P}_{\hat{di}}$ " and insert -- $\hat{P}_{di}$ --, therefor.

Signed and Sealed this
Twenty-third Day of April, 2013

Teresa Stanek Rea
*Acting Director of the United States Patent and Trademark Office*